April 2, 1957  R. J. WHITE  2,787,429
AIRCRAFT CONTROL SURFACE BOOST ARRANGEMENTS
Filed April 14, 1953  3 Sheets-Sheet 1

Roland J. White
  INVENTOR.
BY
HIS PATENT ATTORNEY.

April 2, 1957 R. J. WHITE 2,787,429
AIRCRAFT CONTROL SURFACE BOOST ARRANGEMENTS
Filed April 14, 1953 3 Sheets-Sheet 2
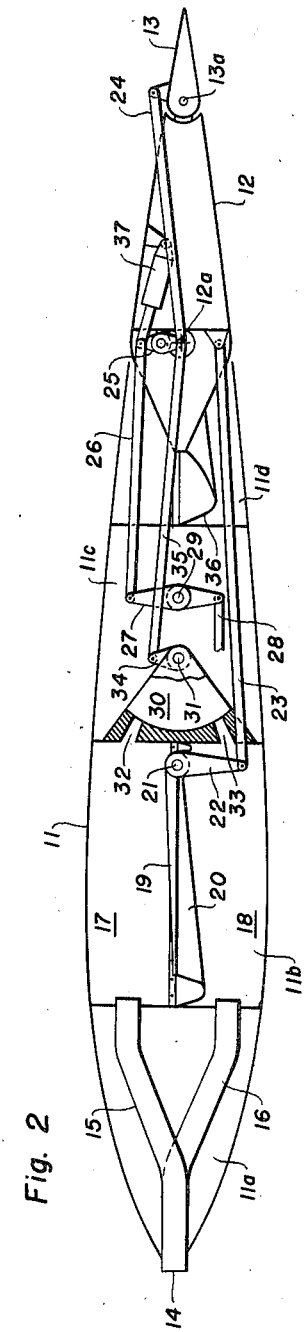
Fig. 2
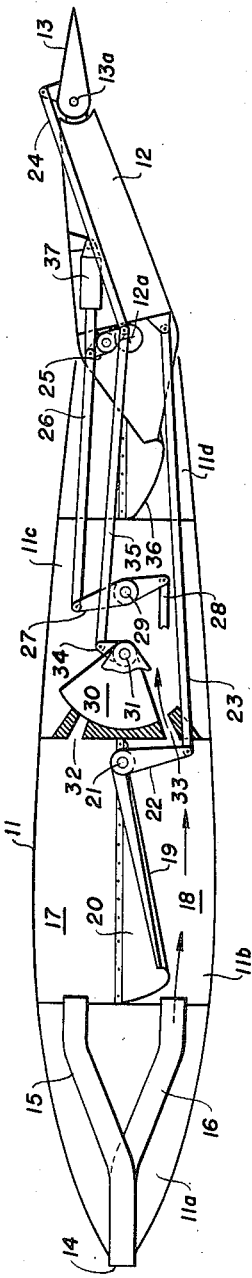
Fig. 3
Roland J. White
INVENTOR.
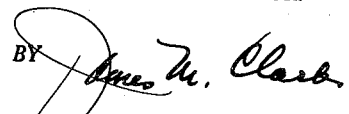
HIS PATENT ATTORNEY.

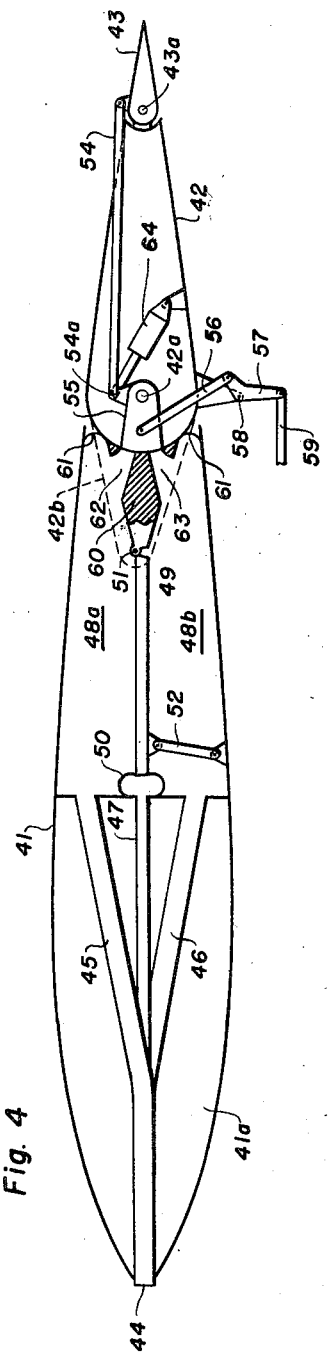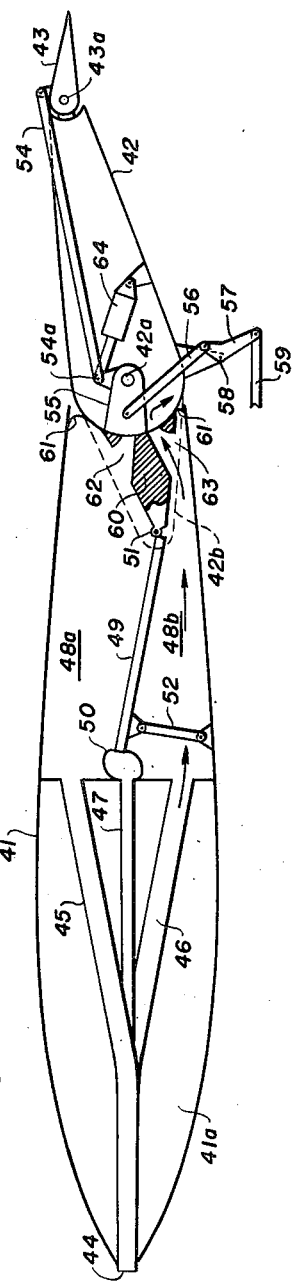
Roland J. White
INVENTOR.

United States Patent Office 2,787,429
Patented Apr. 2, 1957

2,787,429

AIRCRAFT CONTROL SURFACE BOOST ARRANGEMENTS

Roland J. White, Seattle, Wash., assignor to Boeing Airplane Company, a corporation of Delaware Application April 14, 1953, Serial No. 348,699

13 Claims. (Cl. 244—82)

The present invention relates to aircraft controls and more particularly to improvements in control systems having tab and boost means for assisting in control surface operation.

As present-day high-speed aircraft are required to operate over a very large speed range, it has become exceedingly difficult to provide adequate aerodynamic balance of the basic control surfaces for the entire speed regime without encountering over-balance at the high Mach numbers. The trend, therefore, has been to provide less aerodynamic balance to insure that no over-balance will be encountered, but when this is done other means of control must be used to reduce the pilot control forces. Tabs, if used alone to provide this control, would become unusually large and would seriously decrease the control surface effectiveness. Many of these difficulties have been eliminated and overcome by a combination of the tab and boost system and the present invention is directed to improve forms of this combination which eliminate some of the disadvantages found in the normal hydraulic boost arrangements and provides a system that can easily be used with spring tabs. Control surfaces provided with aerodynamic boost and servo means such as tabs, and more particularly spring tabs, have been used with satisfactory results for some time. However, the amount of aerodynamic balance that can be provided by a spring tab is limited, and in general in large aircraft the size of the tab itself is usually limited. Also, as spring tabs become larger the amount of mass balance weight required for the prevention of flutter becomes increasingly large. The use of spring type servo tabs generally provides nonlinear control force characteristics of the control surface which if they are satisfactory for small deflections, will become too great during low speed flight when large control deflections become necessary. The present invention incorporates a pneumatic control surface servo operated by ram air and the improved servo system produces control characteristics similar to that of a spring tab with the exception that the undesirable loss of control surface effectiveness resulting from tab deflection is not present.

The present invention relates to a power boost system for a control surface in which the pilot's control operates an assist tab and a valve means to relieve one side of a diaphragm to static pressure in order that rammed air pressure acting upon the other side of the diaphragm may move the same and, through further linkage, may also move the control surface. The tab booster of the present type is actually an aerodynamic boost using ram air or air from an airplane "q" source and has been designated herein as a tab booster in view of its use with a spring tab. As indicated above, when the pilot operates the spring tab a linkage is arranged to operate the valve of the booster which is formed by sealing off a portion of the pressure plate balance forward of the control surface hinge line. Conduits or ducts extending from the nose of the airfoil, which may be a stabilizer or fin, to the pressure chamber in which the plate balance operates, are carried to both sides of the aerodynamically balanced plate. When the tab booster valve is operated, air from the proper side of the plate balance is bled off causing a balancing hinge moment to be developed and applied in the proper direction. The air which is bled or vented may be discharged from the inboard end of the control surface and hence will not affect the aerodynamic action of the control surface. The amount of balancing hinge moment available from the tab booster can be selected as necessary to assist the spring tab in producing the desired balancing action. A further feature of the present invention is the disposition of the pivot point for the valve and tab control links in being spaced away from or off the center with respect to the control surface axis in order that a follow-up action occurs to set the tab and valve position in accordance with the pilot control setting. A further advantage of the present improved power boost system resides in its dependability due to its use of rammed air pressure for its power source and the fact that it does not require an external power source with its possibility of failure at critical times.

It is, accordingly, a primary object to provide an improved control system embodying a spring tab and an internal aerodynamic booster therefor. It is a further object to provide a booster for a control instrumentality in which the amount of aerodynamic balance supplied is not limited to the size of the spring tab utilized in the control system. It is a further object of the present invention to provide an improved internal booster for a spring tab which utilizes ram air pressure and is not dependent upon an external pressure source. It is a further object to provide a control system which provides improved control force characteristics particularly at low speed flight when large control deflections are usually necessary. It is a further object to provide an improved pneumatic boost arrangement for a control surface with or without the use of a spring tab and to provide a follow-up action which automatically sets the tab and the position of the boost components in accordance with the pilot control setting.

Other objects and advantages of the present invention will become apparent to those skilled in the art after reading the following description, taken in conjunction with the accompanying drawings, forming a part hereof, in which:

Fig. 2 is a sectional elevation of the elevator shown in Fig. 1 as taken along the lines 2—2 thereof;

Fig. 3 is a similar view of the same showing the elevator deflected upwardly from its neutral position;

Fig. 4 is a similar view of a modified form of the invention; and

Fig. 5 is a further view of the same with the control surface shown in a deflected position.

Figure 1A:
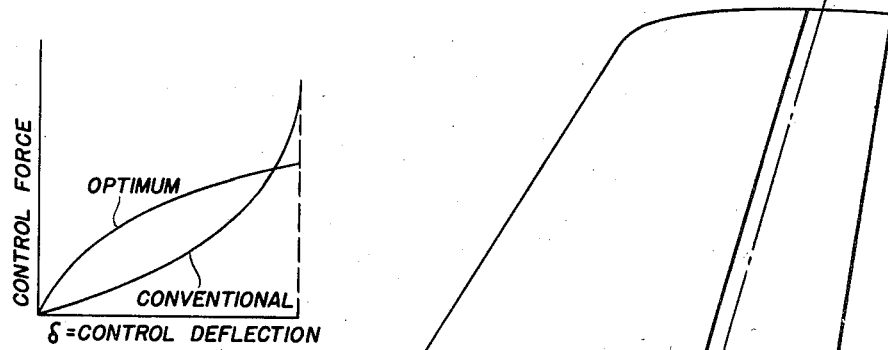
Fig. 1A shows a graphic illustration of control surface characteristics.
Figure 1:
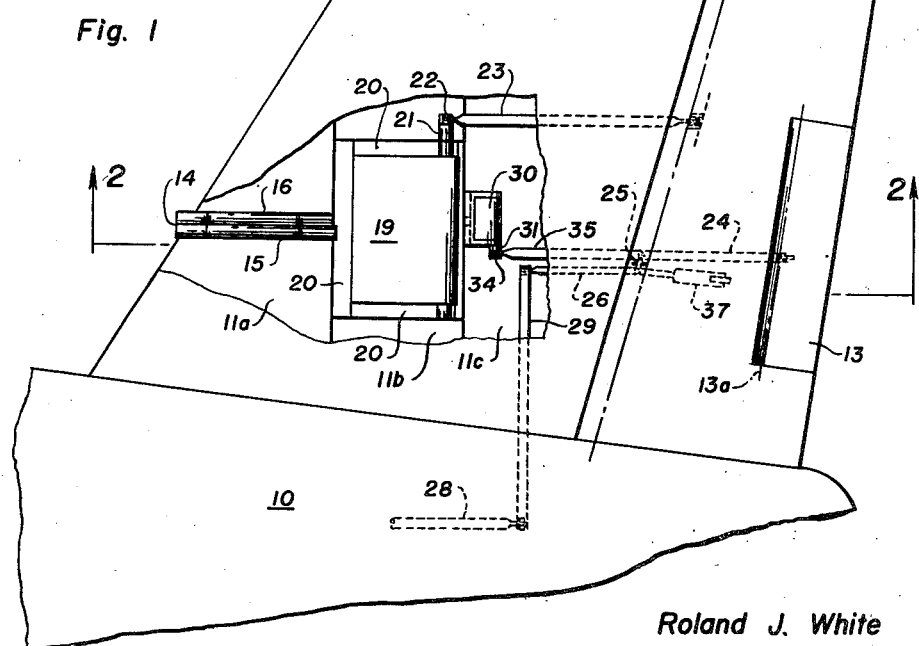
Fig. 1 is a plan view of a horizontal stabilizer and associated elevator control surface to which a form of the present invention has been applied.

Referring now to Fig. 1, the numeral 10 designates the aft or tail portion of the fuselage of an airplane from which there is laterally supported the swept-back horizontal stabilizer surface or airfoil 11. It will, of course, be understood that this invention is also applicable to other airfoils or wings having movable surfaces associated therewith such as rudders, etc. At the trailing portion of the airfoil 11 there is provided an elevator control surface 12 mounted for deflection about its hinge axis or pivot 12a. The trailing edge of the elevator 12 is provided with an inset cut-out portion within which is disposed the tab member 13, in turn pivotally mounted upon the elevator 12 for deflection about its hinge axis 13a.

As more particularly shown in Figs. 2 and 3, taken in conjunction with Fig. 1, the leading edge of the airfoil or stabilizer 11 is provided with a pair of rammed air or "q" inlets 14 which extend rearwardly through the nose compartment 11a. This rammed air is conducted by the upper and lower ducts or conduits 15 and 16, respectively, into the upper and lower pressure chambers 17 and 18 of the diaphragm compartment 11b of the airfoil. Within the compartment 11b, there is pivotally mounted the diaphragm or pressure plate 19 having its peripheral edges attached to a suitable flexible curtain or pressure plate seal 20 whereby rammed air within the upper compartment 17 is prevented from passing downwardly into the lower pressure compartment 18, and vice versa. The pressure plate 19 is pivotally mounted by the pivot 21 extending spanwise of the airfoil, which pivot is suitably supported from the structural partitioning member forming the aft boundary of the pressure compartment 11b, and the pivot is sealed thereagainst to prevent air leakage. Fixedly attached to the pivot 21, to rotate with the pressure plate 19, is a downwardly extending lever 22 pivotally connected, by the rod 23, to the elevator 12 adjacent its lower surface and appreciably below the hinge axis 12a of the elevator. The push or pull forces exerted through the rod 23 transmit the balancing hinge moment to the elevator, and in the normal or balanced condition when the rammed air pressure is the same within each of the compartments 17 and 18, no force is transmitted through the rod 23 to the control surface.

An upwardly extending control bracket on the tab 13 is pivotally connected to the rearwardly extending push-pull rod 24 which in turn is pivotally connected at its forward terminal to the lower terminal of the bellcrank 25 pivotally mounted upon the elevator 12 such that in the neutral position of the tab and the elevator the pivotal connection of the bellcrank and the push-pull rod 24 is aligned with the hinge axis 12a. The upper terminal of the bellcrank 25 is pivotally connected to the aft terminal of the push-pull rod 26 which in turn is pivotally connected at its forward terminal to the upper arm of the bellcrank 27 pivotally mounted upon the torque tube 29. The torque tube 29 and its bellcrank 27 are rotated in either direction for controlled positioning of the elevator 12 and the tab 13 by means of the push-pull actuating rod 28 pivotally connected to the lower arm of the bellcrank 27 and to which rod 28 the pilot control forces are applied.

In order to provide differential pressures between the upper and lower pressure compartments 17 and 18, a valve 30 is pivotally mounted upon the pivot 31 within the valve compartment 11c of the airfoil through the forward partition of which extend the upper and lower valve ports 32 and 33, respectively. The valve 30, which might alternatively be a cylindrical slide valve, is actuated by the lever arm 34 mounted upon the valve pivot 31 and pivotally connected by the push-pull rod 35 with the aft terminal of the push-pull rod 24 in alignment with the elevator hinge axis 12a in the neutral position. In this latter neutral or balanced position, the valve 30 is also in its neutral position in which it closes the valve ports 32 and 33 and causes the rammed air pressures within the compartments 17 and 18 to be substantially in balance and under which condition no forces are applied through the push-pull rod 23 to the elevator 12. The stabilizer airfoil 11 is provided with a further aft compartment 11d which is divided into upper and lower portions by the pressure diaphragm or curtain 36 which extends from the leading edge of the elevator 12 to the forward wall of the compartment 11d. The tab 13 as well as the upper terminal of the bellcrank 25 within the elevator 12, are maintained in the neutral and vertical positions respectively by the spring-actuated cylinder or double-acting tab spring member 37, the cylinder or body portion of which may be pivotally attached to the upper surface of the elevator by suitable bracket means. The double-acting spring 37 has the effect of reducing the amount of the motion out of alignment with the control surface.

The operation of the internal boost control system shown in Figs. 1, 2 and 3 is as follows: With the controls and their associated components in the neutral position as shown in Fig. 2, should the pilot desire to move the elevator 12 upwardly, or in the counterclockwise direction, about its hinge axis 12a, he applies a rearward control force upon the push-pull rod 28 to impart counterclockwise rotation to the torque tube 29 and its associated bellcrank 27. This torque is transmitted in the form of tension or forward pull within the push-pull rod 26 imparting counterclockwise rotation to the bellcrank 25, which being opposed by the tab spring means 37 applies a control force to the upper portion of the elevator about its hinge axis 12a which tends to move the elevator 12 in the counterclockwise direction. At the same time counterclockwise rotation of the bellcrank 25 imparts rearward thrust through the push-pull rod 24 which causes a downward deflection of the tab 13 in a clockwise direction about its hinge axis 13a, and with respect to the elevator 12. This downward deflection of the tab 13 serves to produce a balancing hinge moment for the elevator surface in the usual manner. During this movement, however, the push-pull rod 35 is pulled aft by the push-pull rod 24 in such manner that when the elevator 12 has been deflected through a predetermined angle, which may preferably be a 5 degree movement, as used in a satisfactorily tested installation, the valve 30 will have been rotated by the aft movement of the rods 24 and 35 to the point at which it will uncover the lower port 33. As the port 33 is opened, the dynamic pressure of the ram air within the lower compartment 18 will drop due to the venting flow out through the port into the aft portions 11c and 11d of the airfoil, which airflow is vented at substantially static pressure to the interior of the stabilizer and ultimately vented to the atmosphere. As the pressure in the lower chamber 18 is reduced, the greater pressure in the upper chamber 17, as a result of the pressure differential, exerts a downward force on the plate 19, which in turn transmits a balancing hinge moment to the elevator 12 through the crank arm 22 and the push-pull rod 23, thereby assisting the pilot force applied to the push-pull rod 28.

If the pilot torque tube 29 were suddenly deflected the tab 13 would suddenly be deflected and the corresponding valve ports 32 or 33 would suddenly be opened; however, as the elevator 12 started to respond the tab 13 will reduce its deflection and the vent opening would be closed to a smaller amount. This provides a metering effect which is a very desirable feature of the spring tab arrangement. The amount of the vent opening of the ports 32 and 33 will determine the pressure drop within the respective pressure cells 17 and 18, hence the balancing moment applied to the elevator 12 will be proportional, or nearly so, to the vent opening. The use of the spring tab in conjunction with the internal balance is relatively important, inasmuch as this permits the elevator surface to respond to small control movements, and hence avoids the indeterminate effects of a dead spot as might be present at small vent openings. The type of control disclosed will permit a smaller amount of pressure seal elevator balance to be used and will avoid the complicated and inefficient use of internal plate balances which heretofore have been placed just forward of the elevator hinge line and connected to the transverse wall within the airfoil.

Referring now to Figs. 4 and 5, wherein there is disclosed a modified form of the present internal booster spring tab control arrangement, the numeral 41 indicates an airfoil, which may be a horizontal or vertical stabilizer, having a forward portion 41a and has hingedly mounted at its aft portion the control surface 42 which may be an elevator, rudder or other surface hingedly attached at the pivot 42a. The elevator 42 is provided with a trailing edge tab 43 which is hingedly supported from the elevator at the tab hinge 43a. Rammed air pressure tubes 45 and 46 having forwardly opening ends or "q" inlets at 44 disposed at the leading edge of the airfoil 41, extend rearwardly together with the intermediate pressure tube 47 through the spanwise wall at the aft end of the leading edge compartment 41a such that the tube 45 opens into an upper pressure compartment 48a and the tube 46 opens into the lower pressure compartment 48b. A pressure balance plate 49 terminates at its forward portion in a tubular seal 50 (which may be of the type disclosed in Patent No. 2,331,047 to George S. Schairer) is internally inflated by the pressure tube 47. This tubular seal extends along both sides and the front of the plate balance and has the advantage of reducing time lag in that it is not necessary for the seal to suck from one side to the other when the pressure differential is reversed across the plate. The aft terminal of the pressure plate 49 is pivotally attached by the pivot 51 to the plug valve portion 60 which is supported from the elevator 42 by the bracket 42b and arranged to move therewith about the pivot 42a. The pressure plate 49 floats in its articulated relationship between the pressure compartments 48a and 48b, its position being determined by the deflection of the elevator and its pivotal connection thereto at the pivot 51, and its pivotal support adjacent the tubular seal 50 at its forward portion by means of the pivotally mounted link 52 supported from the lower surface of the stabilizer.

The tab 43 is actuated by the push-pull rod 54 pivotally connected to the tab bracket at a pivot offset from the tab hinge 43a, and the forward terminal of the push-pull rod 54 is attached at the pivot 54a to a relatively movable plug valve portion 55 which is rotatably mounted upon the hinge 42a of the elevator 42. A double-acting spring unit 64 is also pivotally connected to the pivot 54a and to the stabilizer structure adjacent the lower surface for biasing the tab 43 and the plug valve portion 55 into their normal or neutral positions as shown in Fig. 4. The manual control force for movement of the stabilizer 42 is transmitted through the link 56 pivotally connected to the bellcrank 57 rotatable about the pivot 58 by control forces applied to the push-pull rod 59. The valve 60, which as stated above is supported by the bracket 42b for rotation with the elevator 42, is provided with upper and lower ports 62 and 63, which are normally closed by the plug valve portion 55 in the neutral position, and the pressure compartments 48a and 48b in the aft portion of the airfoil 41 are suitably sealed from loss of pressure to the atmosphere by the flexible seals 61.

The operation of the internal booster spring tab modification shown in Figs. 4 and 5, is as follows: With the control surface 42 and the tab 43 in the aligned neutral position with respect to the airfoil 41, upward deflection of the elevator 42 is accomplished by pilot control force applied rearwardly to the push-pull rod 59. This movement causes counterclockwise rotation of the bellcrank 57 about its pivot 58 tending to cause upward and forward movements of the links 56 to thereby impart clockwise rotation to the plug valve portion 55 about the elevator hinge axis 42a. This clockwise rotation of the valve portion 55 about the pivot 42a is resiliently opposed by the spring in the unit 64 which it overcomes to push the rod 54 rearwardly to impart movement in the clockwise direction to the tab 43 about its pivot 43a. Inasmuch as the clockwise rotation of the plug valve portion 55 about its pivot 42a is to some extent opposed by both the tab 43 and the spring unit 64, the upward and forward force applied to the link 56 is similarly opposed and the rearward control force applied to the push-pull rod 59 provides a force moment applied to the elevator 42 and the bellcrank pivot 58 which causes counterclockwise movement of the elevator 42 about its pivot 42a. As the elevator is deflected upwardly, its nose portion, including the valve portion 60 and the supporting bracket 42b, are deflected downwardly moving the pivotal connection 51 downwardly and tilting the pressure plate 49 with it. The clockwise rotation of the valve portion 55 about the pivot 42a with respect to the elevator 42 and the counterclockwise movement of the valve portion 60 with the elevator 42 about its pivot 42a causes opening of the lower port 63 and consequent venting and reduction of pressure from the lower chamber 48b. This causes a differential in pressures in favor of the upper chamber 48a which provides a pressure force downwardly upon the pressure plate 49 and the valve portion 60 which aids in the upward or counterclockwise deflection of the elevator 42, thereby assisting the pilot force which is applied rearwardly to the push-pull tube 59. It will be obvious that movement of the elevator in the opposite direction is accomplished by forward pull upon the push-pull rod 59 and a reversal of the foregoing operation.

It will, accordingly, be noted that each of the above modifications provides an improved power boost system for control surfaces in which the pilot's control operates and assists the tab and a valve means to relieve one side of a diaphragm to static pressure in order that the rammed air pressure acting upon the other side of the diaphragm will move the same and, through linkage, also move the control surface. In each installation, the pivot points for the valve and tab control links is disposed off center from the control surface axis in order that a follow-up action occurs to set the tab and valve position in accordance with the pilot control setting. Among the numerous advantages of the systems disclosed, it should be noted that the present type of boost is not dependent upon an external power source for its operation and a further distinct advantage lies in the fact that the ram air passing through the booster occurs only when a change in control surface angle is effected, as distinguished from the continual flow of ram air flowing through certain prior type boosters in which a continuous source of aerodynamic drag is thereby caused.

The graph in Fig. 1A indicates the optimum control force characteristics which are obtained by the presently disclosed systems as compared with the conventional spring tab type. The curves indicate the control forces against the angle of deflection $\delta$ of the control. In the conventional systems where control forces are satisfactory for small deflections, they will usually become too great during low speed flight when large control deflections become necessary. Whereas, in the present pneumatic servo systems combined with the spring tab device, the control forces are slightly higher for small deflections they approach substantially linear characteristics as larger control deflections become necessary during low speed flight. The present system also compares favorably from the weight standpoint, particularly when the spring tab mass balance weight of the spring tab system is taken into consideration. While the foregoing modifications disclose the use of the pneumatic servo in combination with the spring tab to increase the total balancing capacity, the pneumatic servo is also capable of being used by itself.

Other forms and modifications of the present invention, both with respect to its general arrangement and the details of its several parts, are intended to come within the scope and spirit of this invention as more particularly set forth in the appended claims.

I claim:

1. In an aircraft boost system for a control surface, an airfoil, a control surface pivoted upon said airfoil, a tab pivoted upon said control surface, a ram air pressure compartment within said airfoil divided into differential pressure chambers by a pivoted pressure plate, valve means within said airfoil operatively connected to said tab for relieving either said pressure chamber upon tab movement with respect to said control surface, means operatively connecting said pressure plate with said control surface, resilient means for urging said tab into an aligned position with respect to said control surface, and pilot control means operatively connected to said tab and to said valve means for the operation of said tab and the aerodynamic boost operation of said control surface initiated by relief of one of said chambers and movement of said pressure plate.

2. In an aircraft boost system for a control surface, an airfoil, a control surface pivoted upon said airfoil, a tab pivoted upon said control surface, a ram air pressure compartment divided into differential pressure chambers by a pivoted pressure plate, valve means within said airfoil operatively connected to said tab for relieving either said pressure chamber upon tab movement with respect to said control surface, means operatively connecting said pressure plate with said control surface, resilient means pivotally attached to said control surface for urging said tab into an aligned position with respect to said control surface, and pilot control means operatively connected to said tab, said resilient means and to said valve means for the operation of said tab against the resilient opposition of said resilient means and the aerodynamic boost operation of said control surface initiated by relief of one of said chambers and movement of said pressure plate.

3. In an aircraft boost control system, an airfoil, a control surface movably mounted upon said airfoil, a tab movably mounted upon said control surface, actuating means for applying control forces to said control surface, a spring-biased member operatively connected to said tab, to said control surface and to said actuating means whereby control forces applied to said control surface actuating means impart through said spring-biased member movement to said tab, and means including an aerodynamic pressure plate operatively connected to said control surface initiated by deflection of said tab to apply balance pressure to said control surface.

4. In an aircraft control system, an airfoil, a control surface pivotally mounted upon said airfoil, a tab pivotally mounted upon said control surface, actuating means for applying control forces to said control surface including a pivotally mounted member carried upon said control surface spring-biased into a neutral position, said spring-biased member operatively connected to said tab and to said actuating means whereby control forces applied to said control surface impart through said pivotally mounted member opposite pivotal deflection of said tab, and pressure means including an actuatable pressure plate operatively connected to said control surface initiated by deflection of said tab to apply balance pressure to said control surface.

5. In an aircraft control system, an airfoil, a control surface pivotally mounted upon said airfoil, a tab pivotally mounted upon said control surface, actuating means for applying control forces to said control surface including a member pivotally mounted upon said control surface spring-biased into a neutral position, said spring-biased member pivotally connected to said tab and to said actuating means whereby control forces applied to said control surface impart through said pivotally mounted member opposite pivotal deflection of said tab, and pressure means including valve means and an actuatable pressure plate operatively connected to said control surface initiated by deflection of said tab to apply balance pressure to said control surface.

6. In an aircraft control system, an airfoil, a control surface pivotally mounted upon said airfoil, a tab pivotally mounted upon said control surface, actuating means for applying control forces to said control surface including a member pivotally mounted upon said control surface, said member spring-biased into a neutral position and having a pivotal connection in substantial alignment with said control surface pivotal mounting in the neutral position of said control surface, said spring-biased member pivotally connected at said aligned pivotal connection to said tab and at a further pivotal connection spaced therefrom to said actuating means whereby control forces applied to said control surface impart through said pivotally mounted member opposite pivotal deflection of said tab, and pressure means including valve means and an actuatable pressure plate operatively connected to said control surface initiated by deflection of said tab to apply balance pressure to said control surface.

7. In an aircraft control system, an airfoil, a control surface pivotally mounted upon said airfoil, a tab pivotally mounted upon said control surface, actuating means for applying control forces to said control surface including a member pivotally mounted upon said control surface spring-biased into a neutral position, said spring-biased member operatively connected to said tab and to said actuating means whereby control forces applied to said control surface impart through said pivotally mounted member opposite pivotal deflection of said tab, and pressure means including valve means and an actuatable pressure plate operatively connected to said control surface whereby a follow-up action occurs to position said tab and said valve means in accordance with the setting of said actuating means by the application of control forces thereto.

8. In an aircraft control system, an airfoil, a control surface pivotally mounted upon said airfoil, a tab pivotally mounted upon said control surface, means operatively connected to said control surface for applying controlled deflections thereto, said control surface operating means including a pivotally mounted member spring-biased into its neutral position by double-acting spring means pivotally supported by said control surface, mechanism operatively connecting said pivotally mounted member with said tab for actuation of said tab in the opposite direction upon controlled deflection of said control surface, pressure chambers within said airfoil having a movable diaphragm disposed therebetween, rammed air inlet conduits for supplying air under pressure to said chambers, means operatively connecting said movable diaphragm with said control surface, and valve means operatively connected to said pivotally mounted member for venting air under pressure from one of said chambers whereby said movable diaphragm and said operatively connected mechanism assist in moving the control surface in a direction established by said control surface operating means.

9. In an aircraft control system, an airfoil, a control surface pivotally mounted upon said airfoil, a tab pivotally mounted upon said control surface, means operatively connected to said control surface for applying controlled deflections thereto, valve means carried by said control surface including a pivotally mounted valve member spring-biased into its neutral position with respect to said control surface by double-acting spring means pivotally supported by said control surface, mechanism operatively connecting said pivotally mounted valve member with said tab for actuation of said tab in the opposite direction upon controlled deflection of said control surface, pressure chambers within said airfoil having a movable diaphragm disposed therebetween, rammed air inlet conduits for supplying air under pressure to said chambers, means operatively connecting said movable diaphragm with said valve means whereby movement of said pivotally mounted valve member vents air under pressure from one of said chambers and said movable diaphragm and said operatively connected mechanism assist in moving the control surface in a direction established by said control surface operating means.

10. In an aircraft control system, a relatively fixed airfoil, a control surface movably mounted at the trailing portion of said airfoil, a tab surface movably mounted in the region of the trailing portion of said control surface, control means operatively associated with said control surface and said tab surface for displacing said control surface and said tab surface from their neutral positions in opposite directions, and a pressure boost for assisting said control surface and tab surface deflection comprising a pressure compartment formed in the trailing portion of said airfoil, ram air ducts connecting the leading edge of said airfoil with upper and lower portions of said pressure compartment, valve means disposed within said airfoil, said valve means including a fixed ported portion and a pivoted valve portion, said pivoted valve portion pivotally interconnected to said control surface and tab surface actuating mechanism, and a pressure plate disposed between said pressure compartment portions pivotally mounted upon said airfoil for dividing said pressure compartment into differential pressure chambers whereby pilot actuation of said control surface and said tab surface and deflection of each from the neutral position causes actuation of said valve for the creation of differential pressures within said pressure compartment for assisting in said control movement of said control surface by pressure acting upon said pressure plate.

11. In an aircraft control system, a relatively fixed airfoil, a control surface movably mounted at the trailing portion of said airfoil, a tab surface movably mounted in the region of the trailing portion of said control surface, control means operatively associated with said control surface and said tab surface for displacing said control surface and said tab surface from their neutral positions in opposite directions, and a pressure boost for assisting said control surface and tab surface deflection comprising a pressure compartment formed in the trailing portion of said airfoil, ram air ducts connecting the leading edge of said airfoil with upper and lower portions of said pressure compartment, valve means carried by said control surface, said valve means including a fixed ported portion extending forwardly of the leading edge of said control surface and a pivoted valve portion, said pivoted valve portion pivotally interconnected to said control surface and tab surface actuating mechanism, and a pressure plate pivotally interconnecting said ported valve portion for dividing said pressure compartment into differential pressure chambers whereby pilot actuation of said control surface and said tab surface and deflection of each from the neutral position causes opening of one of said valve ports by said pivoted valve portions for the creation of differential pressures within said pressure compartment for assisting in said control movement of said control surface by pressure acting upon said pressure plate transmitted to the leading portion of said control surface.

12. In an aircraft boost system, an airfoil, a control surface pivotally mounted upon a hinge axis carried by said airfoil, a ram air pressure compartment formed within said airfoil, diaphragm means movably supported upon said airfoil dividing said compartment into a pair of pressure chambers, a lever element pivotally mounted upon said control surface, valve means in communication with each of said pressure chambers, said valve means having a movable valve element operatively connected to said lever element at a pivotal connection aligned with said control surface hinge axis in the neutral position of the control surface, centering means operatively interconnecting said lever element with said control surface tending to oppose displacement of said control surface and said movable valve element from their neutral positions, said diaphragm means operatively connected to said control surface, and pilot control mechanism operatively connected to said lever element at a pivoted connection offset from said hinge axis whereby pilot forces applied to said control mechanism for displacement of said control surface impart movement to said valve element relieving one side of said diaphragm means to static pressure causing movement of said diaphragm and concurrent movement of said control surface through the operative connection thereto, the offset relationship of said valve element connection providing a follow-up action by setting the valve position in accordance with the pilot control setting.

13. In an aircraft boost system for a control surface, an airfoil, a control surface pivoted upon said airfoil, a ram air pressure compartment divided into differential pressure chambers by a two-sided pressure plate pivotally mounted upon said airfoil, means disposed to apply ram air continuously during operation of the aircraft boost system to both sides of said pressure plate, means operatively connecting said pressure plate with said control surface, valve means having a neutral position and being disposed to cooperate with said ram air pressure compartment so as to relieve either of said pressure chambers, and pilot control means operatively connected to said valve means for effecting a movement of said valve means from its neutral position with a resulting aerodynamic boost of said control surface initiated by relief of one of said pressure chambers, said pilot control means also being operatively connected to said control surface through a resilient centering means for the operation of said control surface, said resilient centering means being disposed between said control surface and said valve means for returning said valve means to its neutral position to thus effect an alignment of said control surface with respect to said airfoil.

References Cited in the file of this patent

UNITED STATES PATENTS

| | | |
|---|---|---|
| 1,365,347 | Schneider | Jan. 11, 1921 |
| 2,272,725 | Overbeke | Feb. 10, 1942 |
| 2,484,359 | Tipton | Oct. 11, 1949 |
| 2,597,769 | Ashkenas | May 20, 1952 |